United States Patent [19]

Spencer

[11] Patent Number: 5,564,557
[45] Date of Patent: Oct. 15, 1996

[54] IMPACT ABSORBING APPARATUS FOR A BELT CONVEYOR

[75] Inventor: Donald R. Spencer, Clay City, Ky.

[73] Assignee: Hinkle Contracting Corporation, Paris, Ky.

[21] Appl. No.: 324,840

[22] Filed: Oct. 18, 1994

[51] Int. Cl.⁶ ................................................ B65G 15/08
[52] U.S. Cl. ........................................ 198/830; 198/525
[58] Field of Search ................................ 198/525, 530

[56] References Cited

U.S. PATENT DOCUMENTS

| | | |
|---|---|---|
| 2,261,088 | 4/1940 | Kendall . |
| 2,974,777 | 4/1959 | Marsh . |
| 3,126,090 | 5/1961 | Bitzer . |
| 3,334,728 | 10/1965 | Stinson . |
| 5,031,753 | 7/1991 | Tschantz . |

FOREIGN PATENT DOCUMENTS 996297  2/1983  U.S.S.R. ............................ 198/830

OTHER PUBLICATIONS

Prior public use of conveyor as illustrated in drawings and abstract of Application S/N 07/867,484, now abandoned.

*Primary Examiner*—Joseph E. Valenza
*Attorney, Agent, or Firm*—King & Schickli

[57] ABSTRACT

A shock-absorbing suspension for a conveyor assembly includes brackets that attach to the parallel support beams of the conveyor. The brackets support corresponding saddles, that in turn, mount the conveyor assembly. In a preferred embodiment, the saddles are mounted above inverted U-shaped brackets that are attached to the top flange of the support beams. Dual coil springs are positioned vertically between the brackets and the saddles, with one spring on each side of the support beams. Within the springs are guide pins to restrict lateral movement, while adjustable fasteners preload the springs. In an alternate embodiment, the bracket/saddle combination is reoriented to provide increased overhead clearance. Each longitudinal end of the combination is covered by a skirt of flexible rubber to protect the interior from dust and debris. The brackets on opposing support beams are connected by a telescoping linkage that adjusts the spacing between the bracket/saddle combinations to match the spacing between the support beams. A kit is also provided for retrofitting a conveyor assembly.

14 Claims, 3 Drawing Sheets

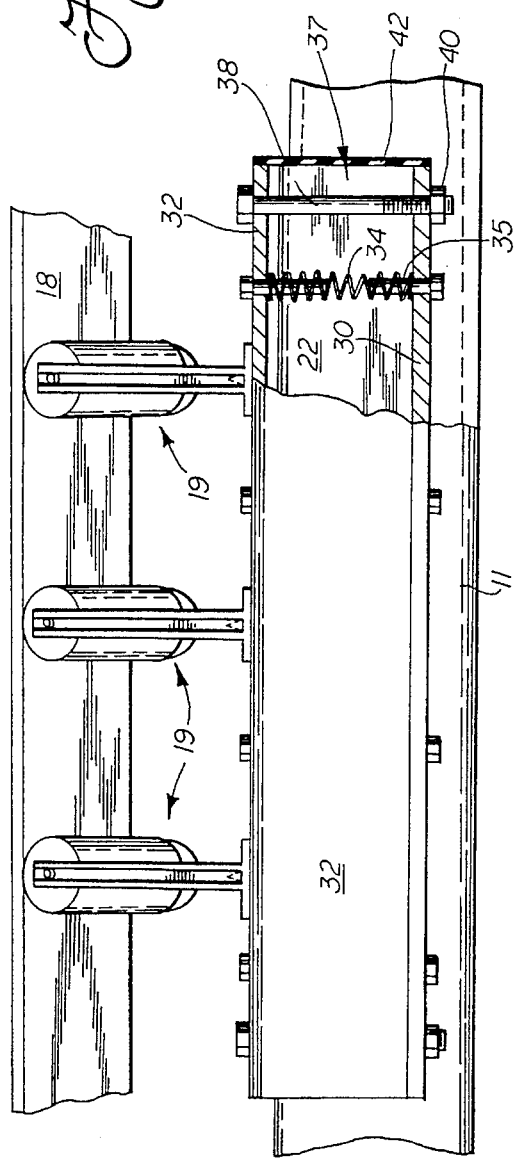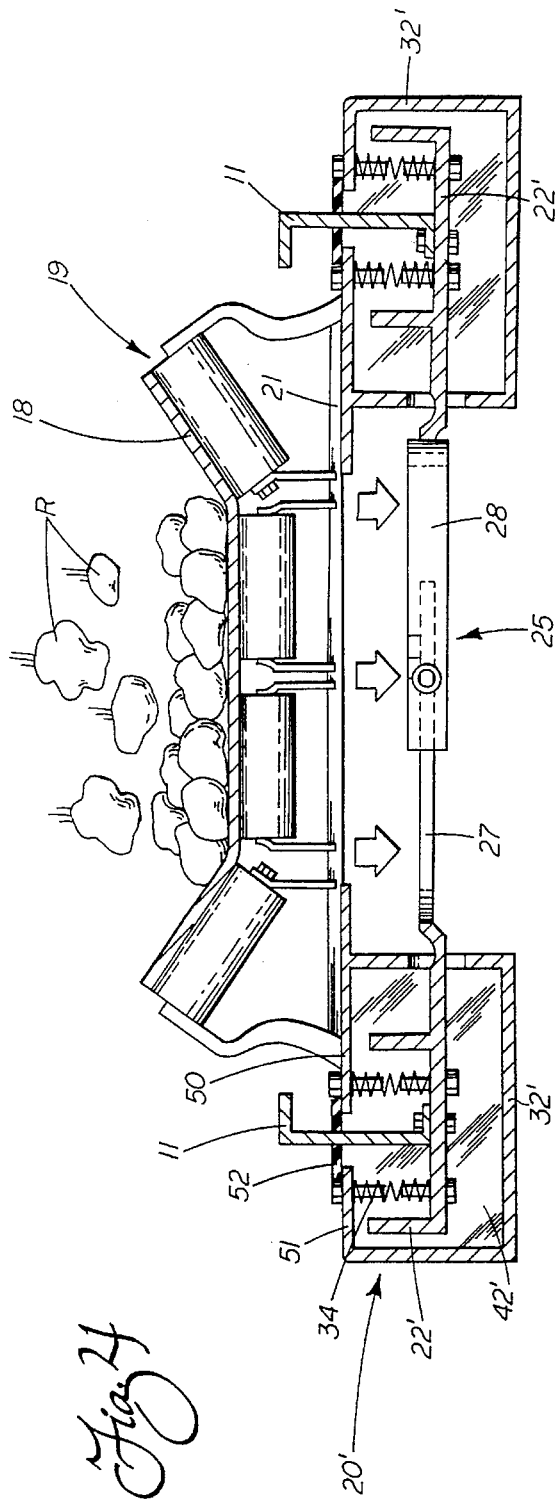

IMPACT ABSORBING APPARATUS FOR A BELT CONVEYOR

TECHNICAL FIELD

The present invention relates generally to a shock-absorbing suspension for a belt conveyor, and more particularly to an improved suspension having a dual spring support assembly with enhanced stability, and further including a simplified design that allows for easy retrofitting to existing conveyors.

BACKGROUND OF INVENTION

Belt conveyors are used in many different industries to transport articles of all shapes and sizes. In some applications conveyors are called upon to receive, transport, and deposit relatively large and heavy pieces of material. In a mining operation for example, conveyors are often used to move bulk aggregate material such as rock, mineral, and ore.

Particularly at the loading station, these large articles, which in the case of mined rock take the form of large boulders, put correspondingly large stresses and strains on the belt conveyor assembly. At a typical loading station, the mined rock falls into a transfer hopper that directs the rock onto the conveyor belt. In a typical conveyor, the belt runs over idler rollers that are rigidly mounted to the support frame of the conveyor. Having no other outlet for dissipation of the energy, the impact shock of the falling boulders is transmitted directly to the belt, rollers, and structural components of the conveyor. This constant pounding at the loading point over time frequently leads to damage of these parts and their connections. Premature fatigue and failure of the conveyor system is frequently the result. This of course leads to costly down time of the mining operation, as well as a substantial expense just for repairs.

Thus, to minimize conveyor damage at the loading section and thereby reduce system downtime and reduce maintenance costs, an apparatus for effectively dissipating impact shock is needed. Further, the apparatus should be a simple design that can be easily retrofitted to existing conveyors with minimal effort.

Although various attempts have been made to address the problem of impact damage to conveyors, these designs have been only partially successful and have failed to provide a highly effective shock-absorbing suspension. Some designs have partially addressed the problem of impact damage by providing idler rollers made of a yielding material. In the Murphy U.S. Pat. No. 2,622,447 for example, the rollers are made of a resilient material such as rubber. Another alleged improvement places a thick resilient pad around the roller, or between the supports and the conveyor frame to absorb a portion of the impact shock. However, using a resilient roller, or the intermediate pad concepts provides only minimal shock absorption, and the substantial damaging forces that remain are transmitted directly to the rigidly-mounted support members. Further, where the resilient pad is placed under the belt, the increase in transport friction greatly increases the power requirement, and in addition causes deleterious belt wear.

Another group of designs have attempted to reduce impact shock by putting the rollers on a movable suspension. In a typical configuration, the rigid frame supporting the rollers rests on single springs that in turn are mounted to the parallel conveyor support beams. This single-spring design has several disadvantages. First, the stiffness of each spring must generally be very high to properly support one half of the impact loading. Thus, the control over the resiliency of the suspension is limited. This design also makes retrofitting expensive and difficult, as the brackets usually must be custom-made to fit the support beam spacing of the conveyor. Further, the suspension assembly for each set of rollers is prone to a lack of lateral stability.

Also, as the springs in these prior art designs are usually mounted on top of the conveyor beams. This increases the height of the conveyor in direct proportion to the height of the spring used. This, in turn, decreases the available headroom above the conveyor belt that is already limited in many mining environments. Additionally, many of these suspensions leave the spring exposed to dirt and debris and possible damage from contact with foreign objects. An example of a typical prior art suspension is U.S. Pat. No. 2,974,777 to Marsh.

Thus, as demonstrated by the deficiencies of the previous designs, there is a need identified for an enclosed conveyor suspension that provides controlled resiliency, increased stability, a minimal increase in conveyor elevation, and is relatively easy to retrofit to an existing conveyor.

SUMMARY OF THE INVENTION

Accordingly, it is a primary object of the present invention to provide an improved impact-absorbing conveyor suspension, and related retrofit kit, having components and features that are designed to overcome the limitations of the prior art.

Another object of the present invention is to provide dual springs at each lateral suspension point that allow a highly efficient balanced and controlled resiliency and improved lateral impact force distribution and stability, and thereby avoid early failure due to impact induced stress.

It is another object of the present invention to provide an integrated shock-absorbing suspension that is adjustable to accommodate conveyors of various dimensions.

It is yet another object of the present invention to provide a shock-absorbing suspension that is enclosed by a flexible skirt to protect the interior components from dust and debris.

It is another object of the present invention to provide a shock-absorbing suspension that maximizes the available headroom above the conveyor belt.

It is still another object of the present invention to provide a modification kit comprising a shock-absorbing suspension that is easily and reliably installed on the parallel beams of an existing conveyor.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

BRIEF DESCRIPTION OF THE INVENTION

To achieve the foregoing and other objects, an improved shock-absorbing suspension is provided for a conveyor assembly mounted on parallel, spaced-apart and longitudinally extending beams. The suspension includes a substantially U-shaped support bracket that attaches to a horizontal flange on each beam and a saddle positioned above each bracket that mounts the conveyor assembly. In the preferred embodiment, the brackets are inverted and secured to the top flange of the conveyor beams, whereby the saddle supports the conveyor assembly above the beams. In an alternate embodiment, the brackets are mounted to the bottom flange of the conveyor beams, such that the saddle positions the conveyor supports below the top flange of the beams. In this manner, additional space above the conveyor is provided for situations in which headroom is restricted. With either configuration, however, the bracket/saddle combination is easily and simply installed on existing longitudinal conveyor beams.

Each bracket/saddle combination extends longitudinally along the conveyor beam and supports at least one roller assembly that supports the conveyor belt. Between the saddle and bracket are mounted dual vertical springs, one spring being positioned on each side of the beam. Utilizing two springs as opposed to one allows for greater control over resiliency and improved lateral stability. Inside the springs are guide pins that constrain the springs to move vertically and provide further protection from side-to-side movement. The springs can be preloaded by an adjustable fastener assembly that joins the bracket to the saddle at their longitudinal ends.

In a further aspect of the present invention, a flexible rubber skirt covers each end of the bracket/saddle combination. This skirt is an important feature because it seals off the interior components of the suspension to provide protection from dust, debris, and damage from foreign objects.

The bracket/saddle combinations on opposing parallel beams are given additional support by an adjustable telescoping linkage extending between the brackets. This linkage also allows the suspension to be adapted during installation according to the particular lateral spacing of the conveyor beams. Thus, in accordance with a key feature of the invention, the suspension can be easily retrofitted to conveyor assemblies having beams of different spacings.

In a further aspect of the present invention, and in accordance with its objects and purposes, a retrofit kit is identified for easily and simply converting a rigidly-mounted conveyor into one with an efficient shock-absorbing suspension.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

FIG. 3 is a side view of the suspension with a partial cross section at one end; and FIG. 4 is a cross sectional view of an alternate embodiment in which the conveyor assembly is supported at a point below the upper flange of the conveyor support beams.

DETAILED DESCRIPTION OF THE DRAWINGS

Figure 1:
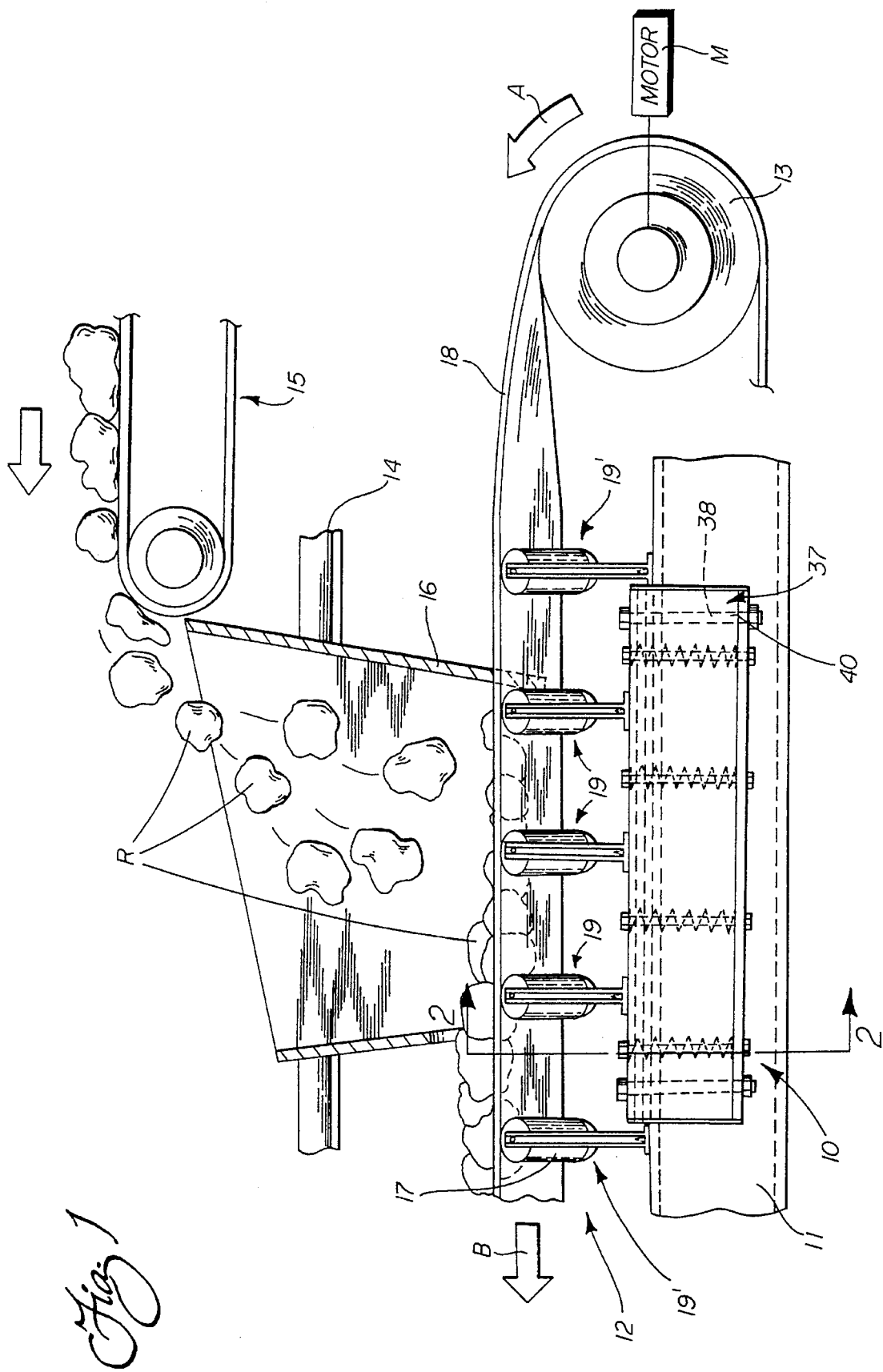
FIG. 1 is a schematic side view representation of a belt conveyor assembly at an article transfer station utilizing roller assemblies gang mounted on a shock-absorbing suspension according to the principles and concepts of the present invention, and so as to cushion the impact from the falling articles, such as mined rock.
Figure 2:
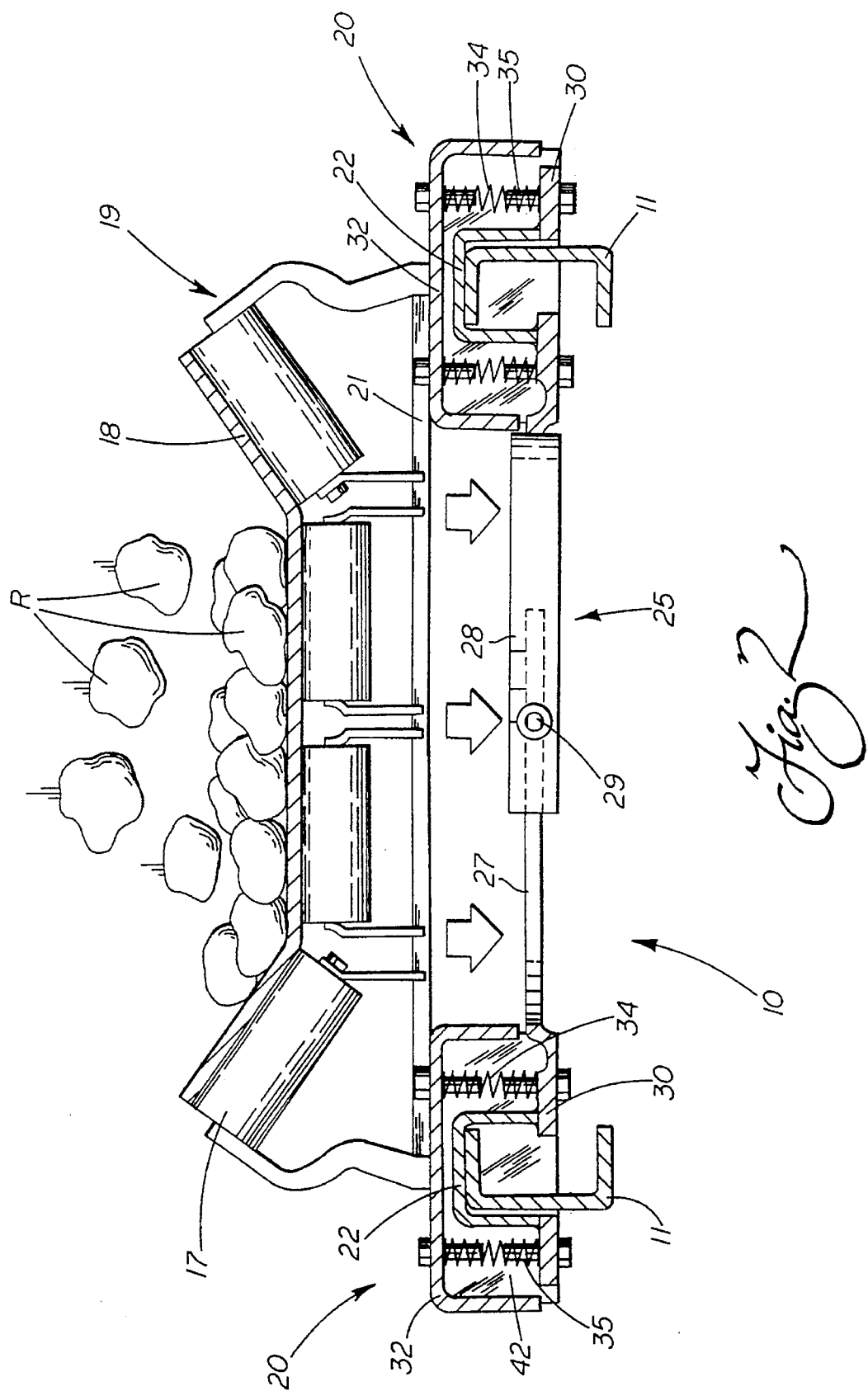
FIG. 2 is a cross sectional view of the suspension assembly taken along line 2—2 of FIG. 1 and showing how the weight of the rock on the conveyor assembly causes downward pressure on the suspension.

Reference is now made to FIGS. 1 and 2 which show a conveyor assembly having a shock-absorbing suspension, generally designated by the reference numeral 10, that is mounted on spaced-apart, parallel and longitudinally extending support beams 11. The suspension 10 is positioned at a transfer station under the loading area of a troughing conveyor assembly, generally designated by the reference numeral 12. Mined limestone rock R in the form of large boulders, are fed by a feed conveyor 15 into a transfer hopper 16, which in turn directs the boulders onto a conveyor belt 18. The hopper 16 is supported by any suitable arrangement, such as a support rail 14.

The conveyor belt 18 is driven by a drive means in the form of a drum 13 that rotates in the direction of arrow A and is powered by a motor M. The mined rock is carried by the conveyor belt 18 in the direction of arrow B to an unloading or other suitable processing station (not shown).

In accordance with the principles of the present invention, several roller assemblies 19 are gang-mounted under the hopper 16 to advantageously provide shock absorption as the mined rock R falls onto the conveyor belt 18. As shown in FIG. 2, each roller assembly 19 supports the conveyor belt 18 across its full lateral width, and includes four idler rollers 17 supported by a base angle member 21. As shown in FIG. 1, those roller assemblies 19' not under the hopper 16 and thus attached to the suspension 10 are mounted directly to the conveyor support beams 11. It will be understood that while the present preferred embodiment of these Figures shows the two outer rollers 17 angled upward to form a troughing conveyor assembly, the broader principles of the invention also encompass a conveyor with an essentially flat conveying surface. Indeed, as presently envisioned and in accordance with the broad concepts of the present invention, the suspension 10 may be used with other basic types of conveyors as well.

As best illustrated by FIG. 2, the suspension 10 includes two laterally spaced support units, generally designated by reference numeral 20, mounted on the conveyor beams 11. As both units 20 are structurally identical, a detailed description of one is offered to describe both. FIG. 2 shows the preferred embodiment in which unit 20 includes a substantially U-shaped support bracket 22 that is inverted and secured to the top flange of the conveyor beam 11 by any suitable means, such as by fasteners or welding.

These brackets 22 on opposite sides of the conveyor assembly 12 are connected by an adjustable telescoping linkage, generally designated by the reference numeral 25. The linkage 25 comprises a bar 27 that slides into a tube 28, and is coupled and frictionally clamped by a locking bolt 29. The bar 27 and the tube 28 are attached at the opposite ends of the linkage to longitudinal support flanges 30, which in turn are welded to the bottom of the inside leg of the adjacent bracket 22. Advantageously, this linkage 25 provides additional stability for the suspension 10. In a further aspect of the present invention, the linkage 25 also allows easy adjustment of the spacing of the opposing brackets 22 to correspond to the spacing between the support beams 11 of a range of conveyors. Thus, the suspension 10 can be efficiently retrofitted in the field to most standard width conveyors without costly and time-consuming custom manufacturing.

Positioned over each of the brackets 22 is a saddle 32 that supports the angle member 21 of each of the roller assemblies 19. As illustrated in FIGS. 1 and 2, dual resilient shock-absorbing means, preferably in the form of coil springs 34, are positioned vertically on each side of the beams 11 and at longitudinally spaced points between the roller assemblies 19. The springs 34 extend from the longitudinal support flanges 30 to the saddle 32 so that vertical impact loads on the conveyor assembly 12 are effectively and efficiently absorbed.

In the prior art suspensions using a single spring, resiliency is difficult to control because among other things a high spring stiffness is required. Advantageously, the present invention overcomes this limitation by using dual springs mounted on opposite sides of the conveyor beam 11. More particularly, it should be appreciated that dual springs allow a lower stiffness spring to be used and that mounting the springs on opposite sides of the conveyor beam 11 yields improved lateral stability.

The springs 34 include guide pins 35 that extend vertically inside the springs and serve to further minimize lateral movement. Furthermore, the dual springs and gang-mounting of the roller assemblies 19 of the present invention increases the surface area over which the impact shocks are dissipated, thereby reducing the localization of these shocks that can accelerate premature failure and fatigue of the component parts.

As shown in FIG. 3, on each end of suspension 10 are means for preloading springs 34. In this instance, a fastener assembly 37 comprising a bolt 38 and a hex nut 40 are used at each end of the suspension 10. The bolt 38 extends downward through aligned holes in the saddle 32 and the flanges 30 attached to the bracket 22. Advantageously, the springs 34 are easily and adjustably preloaded by threading and tightening the nut 40 onto the bolt 38 to a predetermined torque. This moves the saddle 32 downward toward the bracket 22 to the desired extent and further improves the stability of each support unit 20.

As best seen in FIG. 2, each support unit 20 also includes a flexible rubber skirt 42 covering each end. Since the interior of the unit 20 is thus enclosed, it is protected from dirt, debris, and other foreign objects. In a dusty and dirty environment, such as a mining operation, a suspension assembly exposed to the surroundings quickly accumulates dirt and grime that can adversely affect the adjustment, and due to trapped moisture in the dust/debris can substantially shorten the useful life of the suspension. Advantageously, the present design significantly reduces this problem by enclosing the suspension. The enclosure concept also discourages the entry of other foreign matter that can lead to impact damage and/or inadvertent jambing of the suspension.

A typical constraint encountered by conveyor systems in the mining industry, as well as elsewhere, is that of low overhead clearance. In these situations, a lower conveyor belt elevation means a lower profile and thus more load carrying capacity within a given space. Thus, as shown in FIG. 4, an alternate embodiment of the present invention advantageously increases the available overhead clearance above the conveyor belt 18 by supporting the angle member 21 below the upper flange of the conveyor beam 11.

Specifically, in this embodiment of the invention, the U-shaped bracket 22' is turned over and secured to the bottom flange of the conveyor beam 11. The saddle 32' is now inverted and includes two upper horizontal flanges; a longer flange 50 on the inside receives one spring 34 and a shorter flange 51 on the opposite or outside receives the other spring 34. The inside flanges 50 serve as a stable platform to support angle member 21. Each pair of the flanges 50, 51 define a gap through which the conveyor support beam 11 extends vertically. Similarly, the bar 27 and the extension of the tube 28 extend through apertures in the interior legs of the saddles 32' to attach to the respective brackets 22'. Thus, each support unit 20' is free to resiliently compress and relax in response to impact shock.

In a further aspect of this embodiment, dual flexible rubber skirts 52 cover the gap in the upper horizontal flange along the sides of the conveyor support beam 11. Thus, when combined with the rubber skirt 42' that covers each of the longitudinal ends of the support units 20', this embodiment is also completely enclosed to protect the interior from dust, debris and/or other foreign matter.

In accordance with another aspect of the present invention, a retrofit kit is provided for modifying a fixedly mounted conveyor to provide the impact shock absorption as described above. In accordance with the broad aspects of this aspect of the present invention, the kit is a simplified design such that modification is easily and reliably accomplished, even by unskilled workers.

Different conveyors have impact areas with different footprints and other requirements. Thus, it should be appreciated that either with new installations, or with respect to field conversion or modifications using the retrofit kit, the present invention envisions that any suitable number of roller assemblies 19 can be utilized.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally, and equitably entitled.

I claim:

1. A suspension for a conveyor assembly having a conveying surface for receiving articles dropped from above and being mounted on parallel, laterally spaced longitudinal beams, comprising:

a support bracket attached to each of said beams;

a saddle for mounting said conveyor assembly; and dual resilient shock absorbing means being disposed vertically on opposite sides of each of said beams and being positioned between said saddle and said bracket, whereby impact shock on said surface from said articles is absorbed more effectively through controlled resiliency.

2. The suspension as set forth in claim 1, further including an adjustable means for preloading said shock-absorbing means.

3. The suspension as set forth in claim 2, wherein said adjustable means includes at least one fastener assembly being disposed vertically between said saddle and said bracket.

4. The suspension as set forth in claim 3, wherein is provided skirt means to cover the opening around said saddle for protecting said shock-absorbing means from dust and debris.

5. The suspension as set forth in claim 4, wherein said skirt means includes a flexible sheet of rubber covering each end of said saddle.

6. The suspension as set forth in claim 1, wherein said shock-absorbing means comprises:

dual coil springs; and guide means for restraining the movement of said springs to substantially the vertical direction.

7. The suspension as set forth in claim 6, wherein is provided multiple sets of said dual springs extending longitudinally along said conveyor assembly.

8. The suspension as set forth in claim 7, wherein is provided at least one adjustable telescoping linkage extending laterally across said conveyor assembly for connecting said brackets, whereby said linkage provides additional support for said brackets and pre-positions said brackets to correspond to spacing between said beams.

9. The suspension as set forth in claim 1, wherein said conveyor assembly comprises a troughing belt conveyor utilizing troughing rollers and an endless belt to provide said conveying surface.

10. The suspension as set forth in claim 1, wherein said brackets are substantially U-shaped.

11. The suspension as set forth in claim 10, wherein said U-shaped brackets are inverted and mounted on top of each of said beams to support said saddle above said beams.

12. The suspension as set forth in claim 10 wherein:

said U-shaped brackets are mounted on the bottom of each of said beams; and said saddle is inverted and positioned to support said conveyor assembly at a midpoint along the vertical height of each of said beams, such that the overhead clearance above said assembly is maximized.

13. The suspension as set forth in claim 12, wherein:

said beams pass through an opening in the top of said saddles; and flexible flaps are provided on each side of said beams to cover said aperture to protect said shock-absorbing means from dust and debris.

14. A kit for converting a conveyor assembly having a conveying surface for receiving articles dropped from above and being mounted on parallel, laterally spaced-apart longitudinal beams to provide impact absorption, said kit comprising:

a support bracket for attachment to each of said beams;

a saddle for mounting said conveyor assembly; and dual resilient shock-absorbing means being disposed vertically on opposite sides of each of said beams and being positioned between said saddle and said bracket, whereby said saddle mounts on said shock-absorbing means to provide cushioned support for said conveyor assembly.

* * * * *